TWO-TONE REMOTE CONTROL SYSTEM

Filed Sept. 11, 1964

3 Sheets-Sheet 1

Howard E. Rothenbuhler
Dale A. Crowe
INVENTORS

BY Clarence A. O'Brien and Harvey B. Jacobson
Attorneys

Howard E. Rothenbuhler
Dale A. Crowe
INVENTORS

BY Clarence A. O'Brien
and Harvey B. Jacobson
Attorneys

Howard E. Rothenbuhler
Dale A. Crowe
INVENTORS

BY Clarence A. O'Brien
and Harvey B. Jacobson
Attorneys 3,339,141

TWO-TONE REMOTE CONTROL SYSTEM

Howard E. Rothenbuhler and Dale A. Crowe, Sedro Woolley, Wash., assignors to Rothenbuhler Engineering Co., a corporation of Washington Filed Sept. 11, 1964, Ser. No. 395,680
11 Claims. (Cl. 325—37)

This invention relates to a communication system through which coded remote control signals are dispatched for restricted operation of equipment from authorized sources.

One object of this invention is to provide a paging or control system which can function with other single tone systems on the same channel without interaction. This action is achieved by the use of a tone burst, the duration of which is short enough to prevent the operation of a single tone unit on the same tone frequency.

In accordance with the present invention, voice communication may be conducted between remotely located stations and coded control signals conveyed through the same system without interference. This objective of the present invention is achieved by an arrangement in the transmitter unit producing a carrier signal modulated by an initial lower frequency signal of limited duration followed by a different lower frequency signal of continuous indefinite duration, this sequence of signals being adapted to trigger operation of equipment at the receiving station. The remotely controlled equipment could for example form a paging device. Operation of the two-tone signalling facilities may therefore be selectively initiated when the transmitter is set into operation for voice communication purposes. The receiver is therefore associated with facilities which respond only to the coded signals supplied from the transmitter in order to energize a utilization circuit.

An important object of the present invention therefore, is to provide a transmitter unit capable upon selective control to transmit a carrier signal modulated by an initial lower frequency signal for a predetermined short duration immediately followed by a second lower frequency signal of a different frequency value for a continuous or indefinite period.

Another object of the present invention is to provide a receiver unit having facilities for receiving, demodulating and decoding the respective signals from the transmitter, the second lower frequency signal of indefinite duration being operative to energize a utilization circuit only if the receiver receives a carrier signal modulated by the second lower frequency signal within a predetermined initial reception period after the receiver receives the short duration signal modulated by the first lower frequency signal. Operation of the utilization circuit is thereby restricted to the particular coded, two-tone signal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
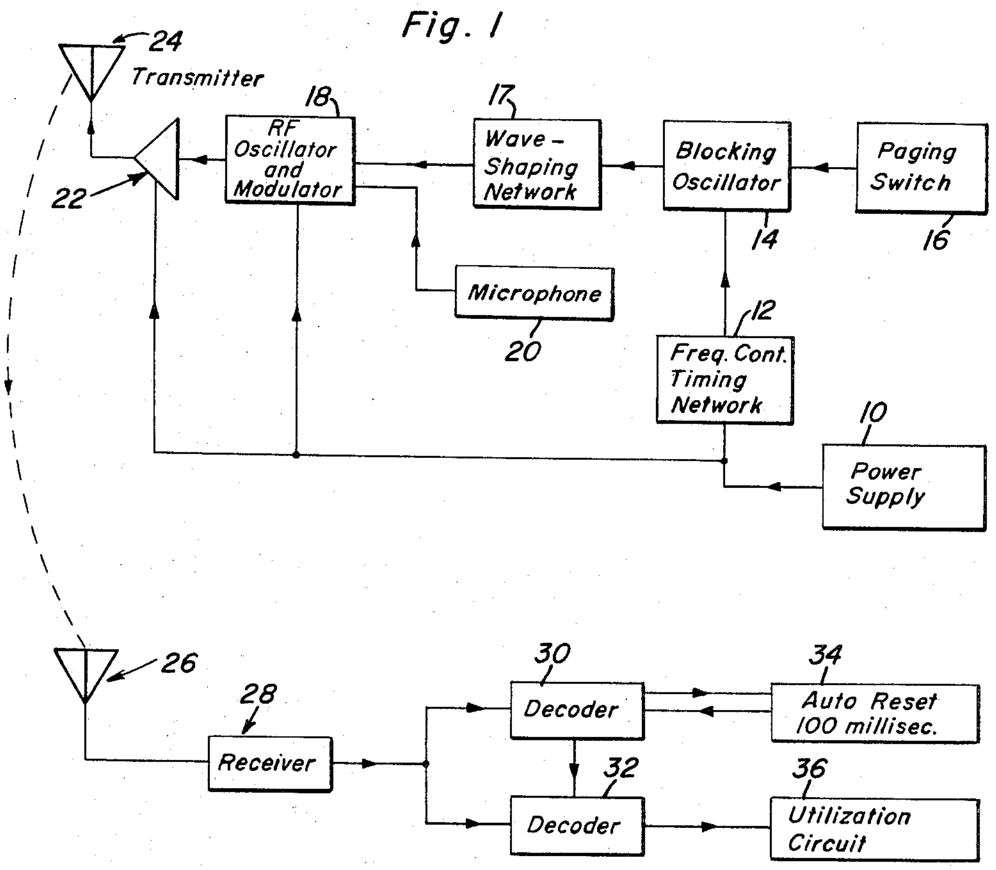
FIGURE 1 is a block diagram illustrating the system of the present invention.

Referring now to FIGURE 1, it will be noted that the transmitter unit shown in the present application includes a regulated power supply 10 for operating the various components of the transmitter including a frequency controlling timing network 12 by means of which the output frequency of a blocking oscillator 14 is determined. Operation of the blocking oscillator is initiated by a paging switch circuit 16 so that a coded two-tone signal is supplied to the R.F. oscillator and modulator 18 after its wave form is shaped by the wave shaping network 17. Regular voice communication is also accommodated by supply of an audio input signal from the microphone 20 to the oscillator and modulator 18. The modulated carrier signal is then amplified by the amplifier stages 22 of the transmitter so that the signal may be radiated by the antenna 24 for pick-up by the antenna 26 of the receiver unit.

Figure 2:
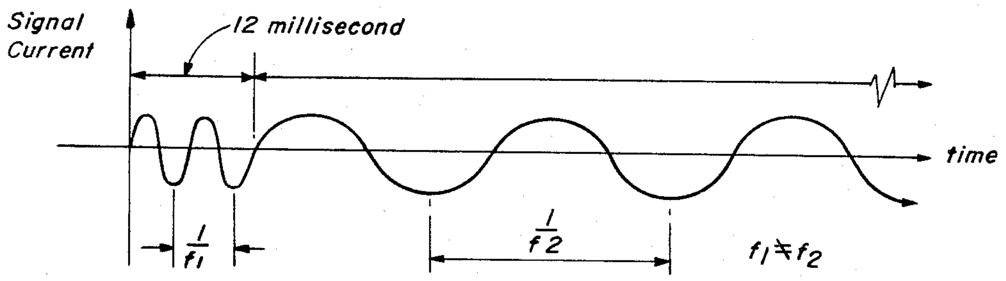
FIGURE 2 is a graphical illustration of the coded signal associated with the system of the present invention.

The modulated carrier frequency signal received by the receiver unit is detected and demodulated by the receiver circuits 28. The output signals from the receiver are supplied to the decoder circuits 30 and 32, the decoder circuit 32 however being normally inoperative. When the transmitter unit is being operated for remote control purposes, as by closing of a paging switch, the transmitter sends and the receiver unit initially picks up the carrier signal modulated at frequency $f_1$ for a limited duration of 12 milliseconds diagrammatically illustrated in FIGURE 2. The initial output signal of the receiver at the frequency $f_1$ causes the decoder circuit 30 to condition the second decoder circuit 32 for operation, limited to a reception period of 100 milliseconds after which the decoder circuit 32 is re-set to its normally inoperative condition. Immediately following the 12 millisecond duration of the initial signal from the transmitter, a carrier signal modulated at a second frequency $f_2$ is transmitted for a continuous or indefinite duration, this second frequency signal being detected and supplied by the receiver to the second decoder 32 to cause it to energize the utilization circuit only if the second decoder 32 has been operatively conditioned by the first decoder 30. In this manner, operation of the utilization circuit is restricted to a particular combination of frequencies $f_1$ and $f_2$ as well as to reception of the carrier signal modulated at the second frequency signal within the reception period of 100 milliseconds referred to above.

It will be apparent from the foregoing, that the transmitter unit in addition to the usual components thereof includes the blocking oscillator 14 under control of the frequency timing network 12 selectively set into operation by the paging switch circuit 16 in order to produce the two-tone signal frequency output from the blocking oscillator. The modulator and amplifier of the transmitter must therefore be designed to alternatively accommodate modulation of the carrier frequency signal by the microphone 20 and the output of the blocking oscillator. The receiver unit on the other hand must have added thereto the decoder circuits 30 and 32, the re-set circuit 34 and utilization circuit 36.

Figure 3:
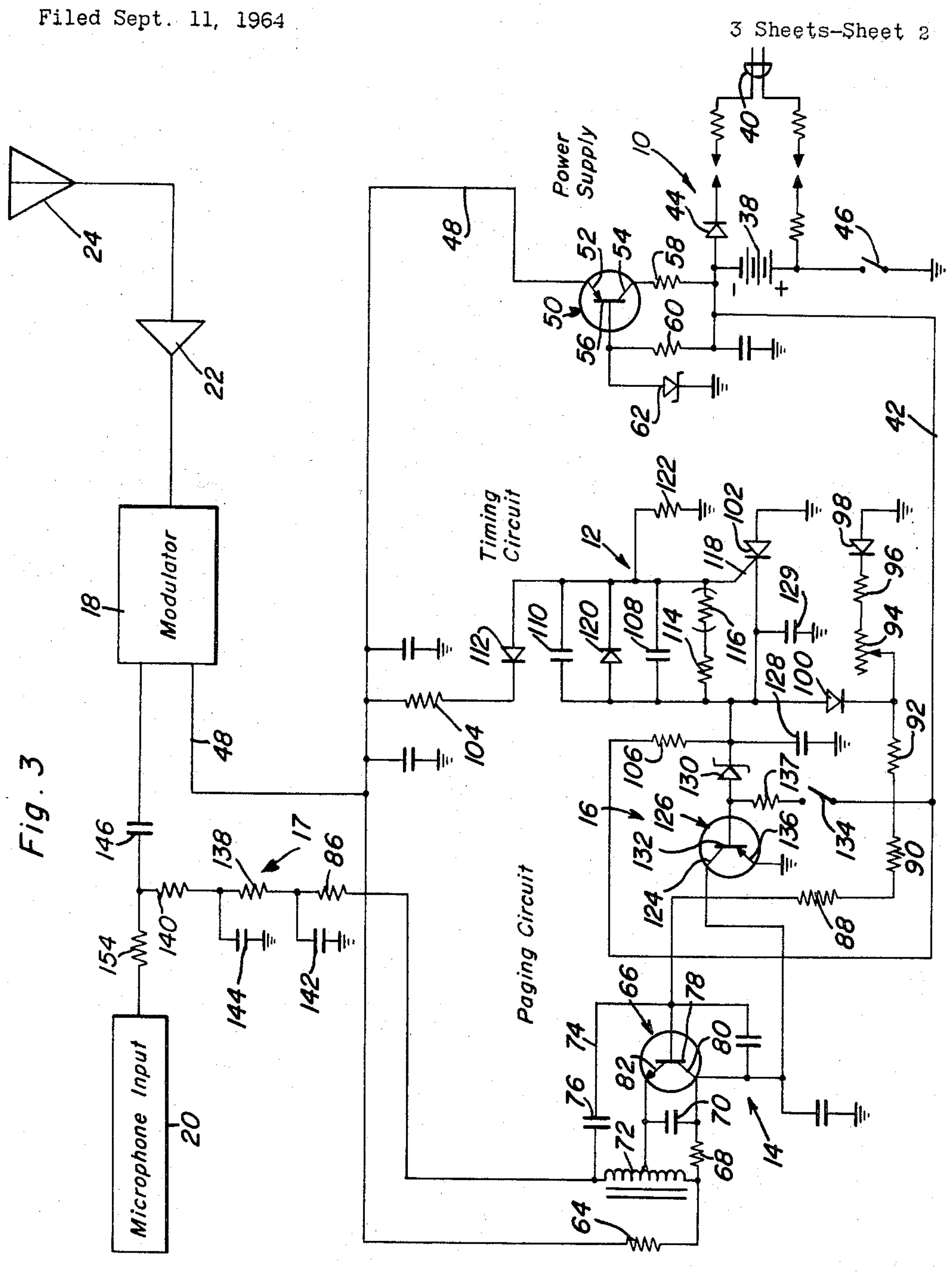
FIGURE 3 is an electrical circuit diagram illustrating one form of transmitter circuit associated with the system of the present invention.

Referring now to FIGURE 3, and initially to the power supply portion 10 thereof, it will be apparent that energy for operating the transmitter is derived either from a battery source of voltage 38 or from an available source of A.C. voltage connectible to the power supply through the power plug 40. Accordingly, the negative terminal of the battery 38 is connected to the negative voltage line 42, the negative voltage line also being connectible to the negative terminal of a rectified voltage source including rectifier 44. Power will therefore be furnished to the negative voltage line 42 upon closing of the power switch 46 grounding the positive terminal of the battery 38 or the negative terminal of the rectified voltage source. A negative voltage line 48 is maintained at a predetermined negative voltage level, less than that of line 42, relative to the positive ground potential by the voltage regulating transistor 50. The negative voltage line 48 is connected to the emitter 52 of the transistor while the collector 54 and base 56 are respectively connected through the resistors 58 and 60 respectively to the negative voltage line 42. Also connected to the base 56 of the transistor, is a grounded Zener diode 62 operative to hold the base at a predetermined bias voltage with respect to ground to thereby provide a constant potential difference between the line 48 and ground.

The negative voltage line 48 is connected to the blocking oscillator circuit 14 through decoupling resistor 64 supplying energy to the emitter circuit of the transistor 66 through the center tap of auto transformer 72. A small positive bias on the emitter is maintained relative to the negative voltage supply because of current flow through resistor 68 as described below, the resistor 68 being connected between the collector 80 and the resistor 64. A bypass capacitor 70 connected between the collector 80 and emitter 82 is arranged to prevent pick-up of stray RF energy from the transmitter, the emitter collector circuit being coupled by the auto-transformer 72 to the feedback line 74 through coupling capacitor 76 in order to supply a feedback signal to the base 78 of the transistor. Accordingly, when the power is turned on, current flow between the collector 80 and the emitter 82 will cause current feedback through the auto-transformer 72 to the base 78 phased to increase the flow in the emitter-collector circuit. When the capacitor 76 receives its maximum charge a reduction in the feedback current cuts off the transistor 66 to re-start the oscillatory cycle, as is well known. It will also be apparent that the frequency of the oscillations of the blocking oscillator circuit 14 and of the signal supplied to the output through the resistor 86, will be controlled by the base current flow which in turn controls the charging rate of the capacitor 76.

The base current flow between the positive ground and the base 78 is determined in part by the series connected resistors 88, 90 and 92, potentiometer 94, resistor 96 and diode 98 or also partly by diode 100 and the silicon controlled switch 102 when switched on. Accordingly, the output frequency of the blocking oscillator is initially predetermined by the path established for the base current through the series connected resistors referred to above and diode 98 for an initial period of 12 milliseconds as aforementioned. An alternate path is then established for the base current through the resistors 88, 90 and 92 and the diode 100 and silicon controlled switch 102, the diode 100 and silicon controlled switch 102 shunting the potentiometer 94, the resistor 96 and diode 98 to thereby change the output frequency of the oscillator to a preselected second value $f_2$ dependent upon the selection of the resistors 88, 90 and 92.

The timing circuit 12 controls the duration of the initial period when the silicon controlled switch 102 is in its off condition. Thus, when the power supply is turned on, negative voltage which has a more negative value than that from line 48 through resistor 104 and diodes 112 and 120 is supplied through the resistor 106 to the cathode circuit of switch 102 to which grounded by-pass capacitors 128 and 129 are connected to respectively remove audio frequency and stray RF energy. This more negative voltage is also applied to control electrode 118 of the switch 102 through capacitor 110.

The storage capacitor 110 connected between the cathode circuit and control electrode 118 is then charged through resistor 122 to apply to the control electrode 112 a voltage which becomes progressively more positive relative to that of the cathode circuit until it reaches a voltage level at which the switch 102 fires and remains in a conductive state until power is removed. The firing voltage level is controlled by the resistor 114 and thermistor 116 connected in parallel with capacitor 110 so as to provide precise timing over varying temperature ranges.

Also, connected in parallel with capacitor 110 is a radio frequency by-pass capacitor 108. The diode 120 prevents reverse charging of the capacitor 110 and provides a low resistance path for discharging this capacitor when the switch 102 fires so as to condition the circuit for a subsequent timing operation. When switch 102 fires the generation of frequency $f_1$, the initial is terminated and the second frequency generated because the cathode circuit will be substantially grounded permitting current flow through diode 100 to shunt potentiometer 94, and resistors 96 and diode 98 as aforementioned.

In order to synchronize operation of the oscillator 14 at its initial frequency $f_1$, it is desirable to prevent generation of the second frequency $f_2$. This can be done by opening switch 134 as shown in FIG. 3. Thus the collector 80 of transistor 66 of oscillator 14 is connected to the collector 124 of switching transistor 126 operative in a conductive state to ground the collector 80 through its emitter 136 and thus cause current flow through resistor 68 to apply a positive voltage to the collector 80 relative to the emitter 82. When the power is turned on, base current is supplied to base 132 of transistor 126 through resistor 106 and Zener diode 130 from line 42 as long as the switch 102 is non-conductive and power is thereby supplied to the oscillator for operation thereof at the initial tone frequency $f_1$. When the switch 102 fires, base current flow to transistor 126 is shunted so that operation of the oscillator ceases under control of the switching transistor. Operation of the oscillator at the second frequency $f_2$ may be effected however if switch 134 is closed connecting the base 132 of transistor 126 through bias resistor 137 to the negative voltage line 42.

The output of the oscillator 14 is fed to wave shaping or low pass filter network 17 including the series connected resistors 86, 138 and 140 and the capacitors 142 and 144 each having one terminal connected to ground. The filtered output of the oscillator is then supplied as a modulating signal to the modulator of any suitable transmitter. A modulating signal is alternatively supplied to the modulator component from the microphone input 20 of the transmitter through coupling capacitor 146. The input signal from the microphone is supplied to the modulator 18 through the coupling resistor 154 and the coupling capacitor 146. Transmitter components suitable for the purposes of the present invention have been manufactured as standard equipment by the Rothenbuhler Engineering Co., Inc., of Sedro Woolley, Wash., under F.C.C. approval.

Figure 4:
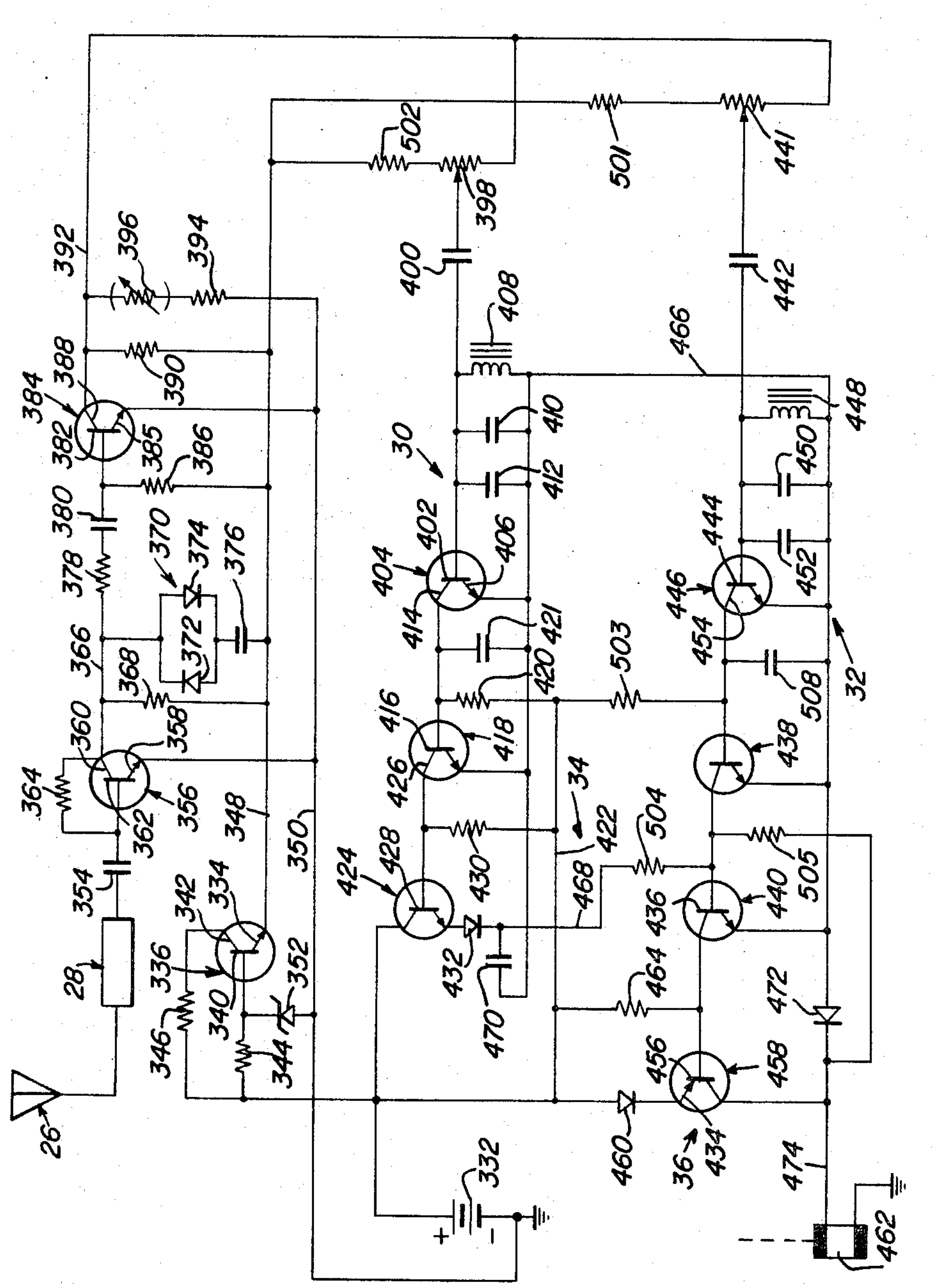
FIGURE 4 is an electrical circuit diagram illustrating one form of receiver circuitry associated with the system of the present invention.

Referring now to FIGURE 4, the signal receiving circuits are powered from a voltage source 332 the positive terminal of which is coupled by resistor 346 to the collector 342 of a voltage regulator transistor 336 and by bias resistor 344 to the base 340. The positive voltage line 348 is connected to the emitter 334 while the negative voltage line 350 is coupled by a zener diode 352 to the base 340 so that the transistor 336 in its normally quiescent state is effective to hold the positive and negative voltage lines at a predetermined potential difference.

The signal radiated from the transmitter will be received and demodulated in the receiver circuit 28. Receiver components suitable for such purposes have been manufactured as standard items by the Rothenbuhler Engineering Co., under approval of the Department of Transport of Canada. Signals at the frequencies $f_1$ or $f_2$ will be fed from the receiver circuit through coupling capacitor 354 and passed through a limiter and amplifier circuit the initial stage of which includes the transistor 356. The emitter 358 of transistor 356 is therefore held at a negative potential by connection thereof to the negative voltage line 350. The proper bias on the base 362 relative to the emitter is maintained by the resistor 364 connected between the collector and base. Connected between the signal line 366 and the positive voltage line 348, is a load resistor 368 in with the limiter circuit 370 which includes the parallel diodes 372 and 374 reversely connected in parallel with each other and in series with the capacitor 376. The resistor 378 and coupling capacitor 380 form an input network for the signals supplied to amplifier 384. Operational bias for the base of transistor 384 is supplied through bias resistor 386 from positive voltage line 348. The emitter 385 is connected to the negative voltage line 350 which is also connected through resistor 394 and thermistor 396 to the output collector 388 so as to insure proper limiter operation over extreme temperature variations in conjunction with the load resistor 390 connected between output line 392 and voltage line 348. Also connected between lines 392 and 348 is an attenuator network consisting of series connected resistor 502 and potentiometer 398 which can be adjusted to provide a proper signal level for operation of the decoder circuit 30 which responds to the initial tone frequency $f_1$.

Signals at frequency $f_1$ are passed to base 402 through the coupling capacitor 400 and the input resonant circuit of decoder 30 including toroid coil 408 and capacitors 410 and 412 in parallel therewith, to render transistor 404 conductive, this resistor being normally cut off. The transistor 418 is normally conductive because of the forward bias imposed on its base 416 from the positive voltage line 422 through bias resistor 420. Transistor 418 thus normally conducts to shunt flow of base current through resistor 430 to base 428 of transistor 424 in the reset circuit 34 to hold transistor 424 non-conducting. Thus, when transistor 404 is rendered conductive shunting the bias resistor 420 and filter capacitor 421, the forward bias is removed from transistor 418 to render it nonconductive. The bias resistor 430 is then no longer shunted and transistor 424 conducts to charge capacitor 470 through diode 432 from the positive terminal of battery 332. The charge on storage capacitor 470 provides positive bias through resistor 504 for transistor 440 to hold it conductive as long as a signal at frequency $f_1$ is being supplied to the decoder circuit 30 and for a period of 100 milliseconds thereafter while the charge on capacitor 470 is being depleted. A signal duration at frequency $f_1$ of approximately 6 milliseconds is required to charge capacitor 470 to the proper level so that the 12 millisecond duration of the initial tone signal at frequency $f_1$ will insure reliable operation.

The decoder circuit 32 will respond to signals at the frequency $f_2$ supplied thereto from the attenuator network including resistor 501 and potentiometer 441 connected between lines 392 and 348. Accordingly, the signal at frequency $f_2$ is passed by the input network including coupling capacitor 442, coil 448, and capacitors 450 and 452 similar to operation of the input circuit of decoder circuit 30. However, bias is supplied to the base of transistor 438 through resistor 504 from the reset circuit 34 to render it conductive for a limited period of time as aforementioned. Thus, when the signal at frequency $f_2$ is supplied to the base 444 of transistor 446 within the 100 millisecond period following the initial signal burst at frequency $f_1$, normally cut off transistors 446 will be rendered conductive to shunt flow of base current normally supplied through bias resistor 503 to transistor 438. The transistor 438 is then turned off so as to prevent it from shunting base current supplied to base 435 of transistor 440 through bias resistor 504 from reset circuit 34.

The emitter 434 of switching resistor 458 is connected by diode 460 to the positive terminal of battery 332 while the base 456 is connected thereto through bias resistor 464 so as to normally provide reverse bias on the switching transistor holding it in a non-conductive state. Thus, when transistor 440 is rendered conductive upon operation of decoder circuit 32, the reverse bias on transistor 458 is removed to render transistor 458 conductive. Electric energy is then supplied through transistor 458 to line 474 to operate any powered device such as relay coil 462. Reverse pulse transients produced in the relay coil are prevented from entering the collector-base circuit of transistor 458 by diode 472 while the output of transistor 458 also furnishes bias to transistor 440 through resistor 505 to maintain it conductive and thus transistor 458 conductive as long as a signal at the frequency $f_2$ is supplied to the decoder circuit 32 from the receiver 28. Opening of switch 46 of FIG. 3 will terminate this signal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a communication system having a transmitter and a receiver, coded signalling means comprising:
- oscillator means connected for selectively modulating a carrier frequency signal transmitted by the transmitter,
- timing means connected to the oscillator means for changing the output thereof to a different modulating frequency after elapse of an initial period of limited duration,
- paging means operatively connected to the oscillator means and the timing means for selectively initiating operation of the oscillator means at the beginning of said initial period of limited duration,
- decoding means operatively connected to said receiver for sequentially responding to said modulating frequencies of the oscillator means,
- reset means operatively connected to the decoding means for restricting operation thereof to an initial reception period in response to a signal at one of said modulating frequencies,
- and utilization circuit means operatively connected to the decoding means for energization in response to a signal at the other of said modulating frequencies only during said initial reception period,
- said oscillator means comprising a blocking oscillator circuit including a transistor having a base, an emitter and a collector,
- said collector being connected to the paging means for normally applying potential for development of an output at the emitter,
- said base being connected to the timing means for controlling the base current to predetermine the frequency of the output at the emitter,
- said timing means comprising a resistive path continuously connected to the oscillator means for establishment of an output at said one of the modulating frequencies, switch means connected to said resistive path for bypass thereof to establish the output of the oscillator means at said other modulating frequency, and temperature compensated capacitive circuit means operatively connected to the switch means to delay bypass of said resistive path for said initial period of limited duration.

2. The combination of claim 1 wherein said paging means comprises, synchronizing circuit means responsive to establishment of a predetermined bias potential in the timing means at the beginning of said period of limited duration for supplying potential to the collector of the oscillator transistor to initiate operation of the oscillator means, and selectively actuated means connected to said synchronizing circuit means for initiating operation of the oscillator means at any time.

3. The combination of claim 2 wherein said reset means comprises current conducting means rendered conductive by signals supplied to said decoding means at one of said modulating frequencies to the exclusion of said other modulating frequency, a control device connected to said decoding means for conducting current when signals are supplied only at said other modulating frequencies, bias control means connected to said control device for controlling the operational period thereof, energy storage means charged by the current conducting means when conductive for rendering the bias control means operative to hold the control device conductive for said initial reception period.

4. The combination of claim 3 wherein said decoding means comprises a pair of resonant circuits respectively tuned to said modulating frequencies of the oscillator means, and means operatively connecting one of said resonant circuits to the utilization circuit means for energization thereof upon successive reception of signals at said frequencies during the initial reception period.

5. In a communication system having a transmitter and a receiver, coded signalling means comprising:
oscillator means connected for selectively modulating a carrier frequency signal transmitted by the transmitter,
timing means connected to the oscillator means for changing the output thereof to a different modulating frequency after elapse of an initial period of limited duration,
paging means operatively connected to the oscillator means and the timing means for selectively initiating operation of the oscillator means at the beginning of said initial period of limited duration,
decoding means operatively connected to said receiver for sequentially responding to said modulating frequencies of the oscillator means,
reset means operatively connected to the decoding means for restricting operation thereof to an initial reception period in response to a signal at one of said modulating frequencies;
and utilization circuit means operatively connected to the decoding means for energization in response to a signal at the other of said modulating frequencies only during said initial reception period,
said timing means comprising, a resistive path continuously connected to the oscillator means for establishment of an output at said one of the modulating frequencies, switch means connected to said resistive path for bypass thereof to establish the output of the oscillator means at said other modulating frequency, and temperature compensated capacitive circuit means operatively connected to the switch means to delay bypass of said resistive path for said initial period of limited duration.

6. The combination of claim 5 wherein said reset means comprises current conducting means rendered conductive by signals supplied to said decoding means at one of said modulating frequencies to the exclusion of said other modulating frequency, a control device connected to said decoding means for conducting current when signals are supplied only at said other modulating frequency, bias control means connected to said control device for controlling the operational period thereof, energy storage means charged by the current conducting means when conductive for rendering the bias control means operative to hold the control device conductive for said initial reception period.

7. In a communication system having a transmitter, coded signalling means comprising:
oscillator means for selectively modulating a carrier frequency signal transmitted by the transmitter,
timing means connected to the oscillator means for changing the output thereof to a different modulating frequency after elapse of an initial period of limited duration,
and paging means operatively connected to the oscillator means and the timing means for selectively initiating operation of the oscillator means at the beginning of said initial period of limited duration,
said oscillator means comprising, a blocking oscillator circuit including a transistor having a base, an emitter and a collector, said collector being connected to the paging means for normally applying potential for development of an output at the emitter,
said base being connected to the timing means for controlling the base current to predetermine the frequency of the output at the emitter,
said paging means comprising, synchronizing circuit means responsive to establishment of a predetermined bias potential in the timing means at the beginning of said period of limited duration for supplying potential to the collector of the oscillator transistor to initiate operation of the oscillator means, and selectively actuated means connected to said synchronizing circuit means for initiating operation of the oscillator means at any time.

8. The combination of claim 7 wherein said timing means comprises, a resistive path continuously connected to the oscillator means for establishment of an output at said one of the modulating frequencies, switch means connected to said resistive path for by-pass thereof to establish the output of the oscillator means at said other modulating frequency, and temperature compensated capacitive circuit means operatively connected to the switch means to delay by-pass of said resistive path for said initial period of limited duration.

9. In a communication system having a transmitter, coded signalling means comprising:
oscillator means for selectively modulating a carrier frequency signal transmitted by the transmitter,
timing means connected to the oscillator means for changing the output thereof to a difference modulating frequency after elapse of an initial period of limited duration,
and paging means operatively connected to the oscillator means and the timing means for selectively initiating operation of the oscillator means at the beginning of said initial period of limited duration,
said timing means comprising, a resistive path continuously connected to the oscillator means for establishment of an output at said one of the modulating frequencies, switch means connected to said resistive path for bypass thereof to establish the output of the oscillator means at said other modulating frequency, and temperature compensated capacitive circuit means operatively connected to the switch means to delay bypass of said resistive path for said initial period of limited duration.

10. A communication system comprising:
transmitter for transmitting a signal including a radio frequency carrier,
modulating means for modulating said carrier,
control means for initiating the operation of said modulation means for first causing said modulation means to modulate said carrier with a first frequency signal for a time period of predetermined limited duration and for immediately thereafter causing said modulation means to modulate said carrier with a different frequency signal to thereby cause said transmitter means to first transmit said carrier modulated by a burst of said first frequency signal and then transmit said carrier modulated by a second frequency signal,
a receiver including means for receiving and demodulating the signal transmitted from said transmitter to provide an output including said burst of said first frequency signal followed by said second frequency signal,
a normally operative first decoding circuit means and a normally inoperative second decoding circuit means each connected to be supplied with said output and a utilization circuit means controlled by said second decoding circuit means,
said first decoding circuit means having means responsive to said burst of said first frequency signal in the output from said receiver for rendering said second decoding circuit operative for a time period of predetermined limited duration overlapping the time during which said output includes said second frequency signal, said second decoding circuit means having means responsive to said second frequency signal in the output of said receiver for causing energization of said utilization circuit means.

11. The communication system of claim 10 in which said control means includes means for limiting the duration of said burst of said first frequency signal to approximately 12 milliseconds and said first decoding circuit includes means for rendering said second decoding circuit operative for a period of time extending approximately 100 milliseconds after the termination of said burst of said second frequency signal in the output from said receiver.

References Cited

UNITED STATES PATENTS

| | | | |
|---|---|---|---|
| 2,724,049 | 11/1955 | Rouault | 340—171 X |
| 2,921,292 | 1/1960 | Undy | 325—155 X |
| 3,217,255 | 11/1965 | Broadhead et al. | 325—64 |
| 3,271,680 | 9/1966 | Reynolds | 325—37 |

JOHN W. CALDWELL, *Acting Primary Examiner.*

DAVID G. REDINBAUGH, *Examiner.*

UNITED STATES PATENT OFFICE

CERTIFICATE OF CORRECTION

Patent No. 3,339,141 August 29, 1967

Howard E. Rothenbuhler et al.

It is hereby certified that error appears in the above numbered patent requiring correction and that the said Letters Patent should read as corrected below.

Column 4, line 6, for "fires" read -- fires, --; line 7, strike out ", the initial"; line 74, after "in" insert -- parallel --; line 75, strike out "parallel"; column 5, line 65, for "resistor" read -- transistor --; column 8, line 48, after "transmitter" insert -- means --; line 63, after "transmitter" insert -- means --.

Signed and sealed this 9th day of July 1968.

(SEAL)

Attest:

Edward M. Fletcher, Jr.

Attesting Officer

EDWARD J. BRENNER

Commissioner of Patents